(12) United States Patent
Ho

(10) Patent No.: US 9,297,189 B2
(45) Date of Patent: Mar. 29, 2016

(54) DEVICE HAVING OPENING STRUCTURE AND OPENING STRUCTURE THEREOF

(71) Applicant: Li-Yin Ho, Taipei (TW)

(72) Inventor: Li-Yin Ho, Taipei (TW)

(\*) Notice: Subject to any disclaimer, the term of this patent is extended or adjusted under 35 U.S.C. 154(b) by 41 days.

(21) Appl. No.: 14/249,979

(22) Filed: Apr. 10, 2014

(65) Prior Publication Data

US 2014/0306463 A1 Oct. 16, 2014

(30) Foreign Application Priority Data

Apr. 10, 2013 (TW) .............................. 102206527 U

(51) Int. Cl.
*E05C 19/16* (2006.01)
*E05B 65/00* (2006.01)
*G06F 1/16* (2006.01)

(52) U.S. Cl.
CPC .............. *E05C 19/16* (2013.01); *E05B 65/0067* (2013.01); *G06F 1/1679* (2013.01); *G06F 1/1616* (2013.01); *Y10T 292/11* (2015.04)

(58) Field of Classification Search
CPC ... E05B 65/0067; E05C 19/16; G06F 1/1679; G06F 1/1616
USPC ........................................ 292/251.5, DIG. 11
See application file for complete search history.

(56) References Cited

U.S. PATENT DOCUMENTS

| | | | |
|---|---|---|---|
| 6,929,291 B2* | 8/2005 | Chen ........................... | 292/251.5 |
| 2007/0013682 A1* | 1/2007 | Lin ........................ | G06F 1/1616 345/184 |
| 2008/0061565 A1* | 3/2008 | Lee et al. .................... | 292/251.5 |
| 2009/0268386 A1* | 10/2009 | Lin ........................ | G06F 1/1616 361/679.02 |
| 2009/0296328 A1* | 12/2009 | Lin et al. ................... | 361/679.02 |
| 2014/0054904 A1* | 2/2014 | Andrews et al. .............. | 292/144 |

\* cited by examiner

*Primary Examiner* — Alyson M Merlino
(74) *Attorney, Agent, or Firm* — Locke Lord LLP; Tim Tingkang Xia, Esq.

(57) ABSTRACT

A device having an opening structure includes a first body having a first locking part, a second body having a second locking part, a first magnetic component, and a second magnetic component. The second body has a closing position and an unlocking position relative to the first body. The first body overlaps the second body when the second body is located at the closing position. The first locking part separates from the second locking part when the second body is located at the unlocking position. The first magnetic component has a first pole fixed to the first locking part. The second magnetic component has a second pole and a third pole. The second pole attracts the first pole, and the third pole repels the first pole. The second pole is pivoted on the second body around an axis.

6 Claims, 6 Drawing Sheets

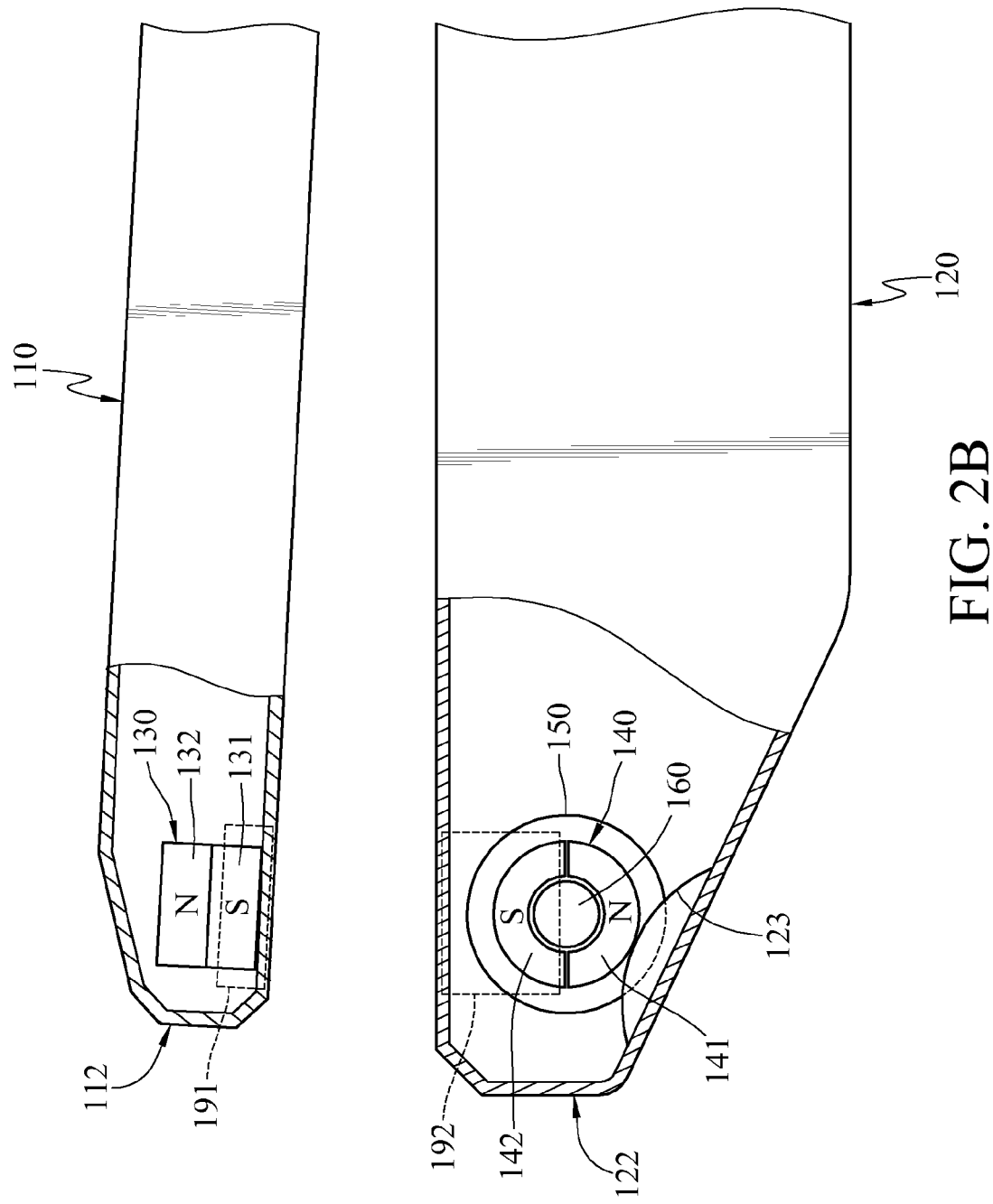

DEVICE HAVING OPENING STRUCTURE AND OPENING STRUCTURE THEREOF

CROSS-REFERENCE TO RELATED APPLICATIONS

This non-provisional application claims priority under 35 U.S.C. §119(a) on Patent Application No(s). 102206527 filed in Taiwan, R.O.C. on Apr. 10, 2013, the entire contents of which are hereby incorporated by reference.

TECHNICAL FIELD

The disclosure relates to a device having opening structure and an opening structure thereof, more particularly to a device having a magnetic opening structure and a magnetic opening structure thereof.

BACKGROUND

For a device having two bodies such as a traditional box, a notebook or a tablet with a keyboard, the elastic element and the hook were usually used to fix the two bodies in a detachable manner in the early days. For example, an elastic hook is used to fix the covering body and the accommodated body of a traditional box. However, the elastic element easily abrades and loses the fastening ability after long-term use. Take the notebook as an example. The hook connected with an elastic element is used to fix the screen and the computer, but the hook may not return to the original position because of elastic fatigue.

Recently, some manufacturers develop a hinge, and the force to release the hinge is various with different opening angles. The internal ramp structure in the hinge is utilized to make the force applied on the opening position different with different opening angles. The notebook with this hinge is designed for the purpose that the force applied to open the screen is larger. Therefore, when the screen is closed, it is more difficult to open it and the screen can be stably fixed to the computer. However, the internal ramp structure is easily damaged when the applied force abrades the ramp. Consequently, it is important to develop a structure which is not only capable of fixing or releasing a device having two bodies but also capable of avoiding the elastic fatigue.

SUMMARY

A device having an opening structure is provided. The device comprises a first body where a first locking part is disposed, a second body where a second locking part is disposed, a first magnetic component having a first pole and fixed to the first locking part, and a second magnetic component having a second pole and a third pole. The second body is disposed on the first body and has a closing position and an unlocking position relative to the first body; the first body overlaps the second body with the first locking part being adjacent to the second locking part when the second body is located at the closing position. The first locking part separates from the second locking part when the second body is located at the unlocking position. The second pole attracts the first pole, the third pole repels the first pole; the second pole is pivoted on the second body around a first axis, the second pole and the third pole rotate around the first axis to be located at or leave from the second locking part.

Moreover, an opening structure configured to be disposed on a device having a first body and a second body is provided. The second body is disposed on the first body and has a closing position and an unlocking position relative to the first body. The first body overlaps the second body when the second body is located at the closing position. The opening structure comprises a first locking part configured to be disposed on the first body, a second locking part configured to be disposed on the second body, a first magnetic component having a first pole and fixed to the first locking part, and a second magnetic component having a second pole and a third pole. The second pole attracts the first pole, the third pole repels the first pole. The second magnetic component is configured to be pivoted on the second body, and the second pole and the third pole rotate around a first axis to be located at or leave from the second locking part.

BRIEF DESCRIPTION OF THE DRAWINGS

The present disclosure will become more fully understood from the detailed description and the drawings given herein below for illustration only, and thus does not limit the present disclosure, wherein:

FIG. 2B is an enlarged cross-sectional view of a device having an opening structure located at an unlocking position according to an embodiment of the disclosure;

DETAILED DESCRIPTION

Figure 1A:
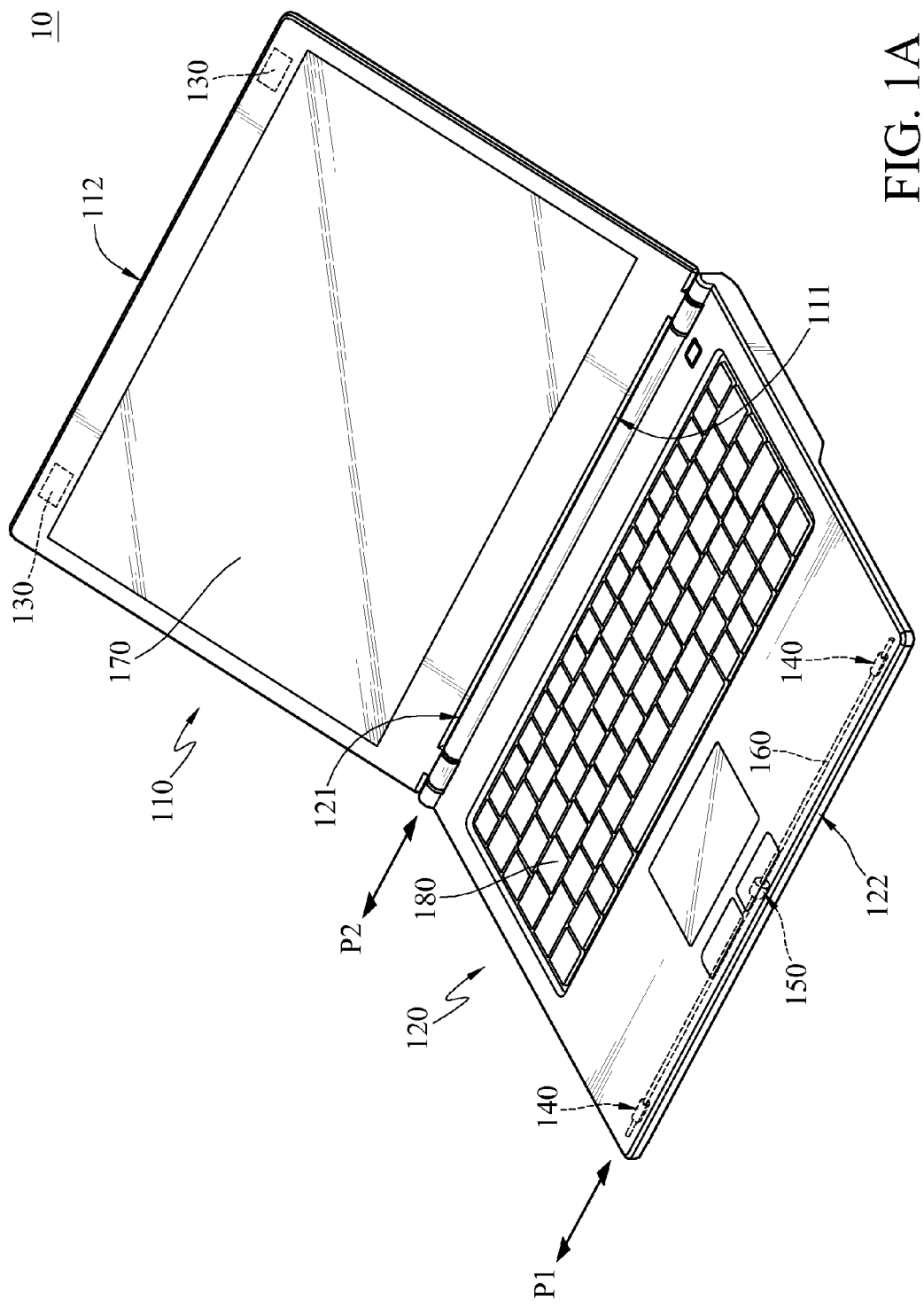
FIG. 1A is a perspective view of a device having an opening structure according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
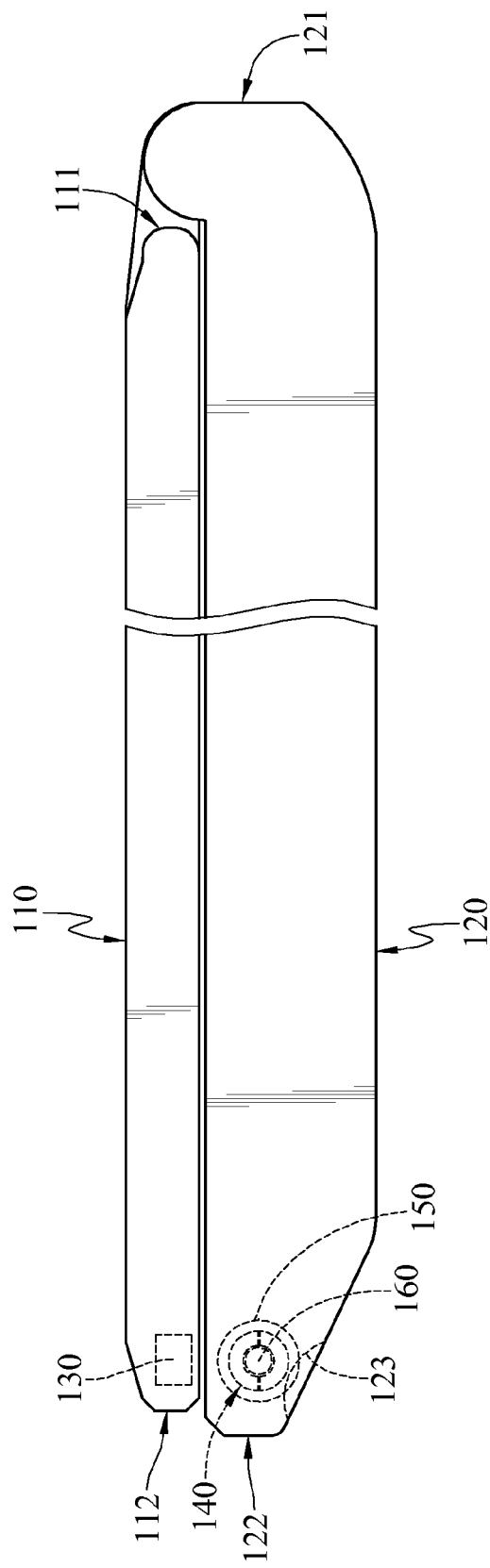
FIG. 1B is a cross-sectional view of a device having an opening structure located at a closing position according to an embodiment of the disclosure.

FIG. 1A is a perspective view of a device having an opening structure 10 according to an embodiment of the disclosure. FIG. 1B is a cross-sectional view of the device having the opening structure 10 located at a closing position according to an embodiment of the disclosure. As shown in FIG. 1A and FIG. 1B, the device having the opening structure 10 includes a first body 110, a second body 120, the opening structure, a display unit 170 and an input unit 180. The opening structure includes a first locking part 191 (shown in FIG. 2A), a second locking part 192 (shown in FIG. 2A), a first magnetic component 130, a second magnetic component 140, a knob 150, and a pivot 160.

The second body 120 is disposed on the first body 110 and has the closing position and an unlocking position relative to the first body 110. The first body 110 has a first side 111 and a second side 112 opposite to each other. The second body 120 has a first side 121 and a second side 122 opposite to each other. The first side 111 of the first body 110 is pivoted on the first side 121 of the second body 120 around a second axis P2.

The first magnetic component 130 is fixed on the second side 112 of the first body 110. The pivot 160 is disposed on the second side 122 of the second body 120. The second magnetic component 140 and the knob 150 are fixed on the pivot 160 to dispose the second magnetic component 140 and the knob 150 on the second side 122 of the second body 120. The pivot 160 is located at a first axis P1 to pivot the second magnetic component 140 and the knob 150 on the second side 122 of the second body 120 around the first axis P1. The second body 120 has a concave surface 123 with respect to the knob 150. At least part of the knob 150 is exposed to the concave surface 123. In this embodiment, the first axis P1 is parallel to the second axis P2, but the disclosure is not limited thereto. In other embodiment, the first axis P1 is perpendicular to the second axis P2.

The display unit 170 is disposed on the first body 110. The input unit 180 is disposed on the second body 120. In this embodiment, the first body 110 is a cover of a notebook, and the second body 120 is a computer of a notebook. In other embodiments, a first body 110 is a tablet, a computer protection, or a clamping apparatus, and a second body 120 is a keyboard or a touch panel.

Figure 2A:
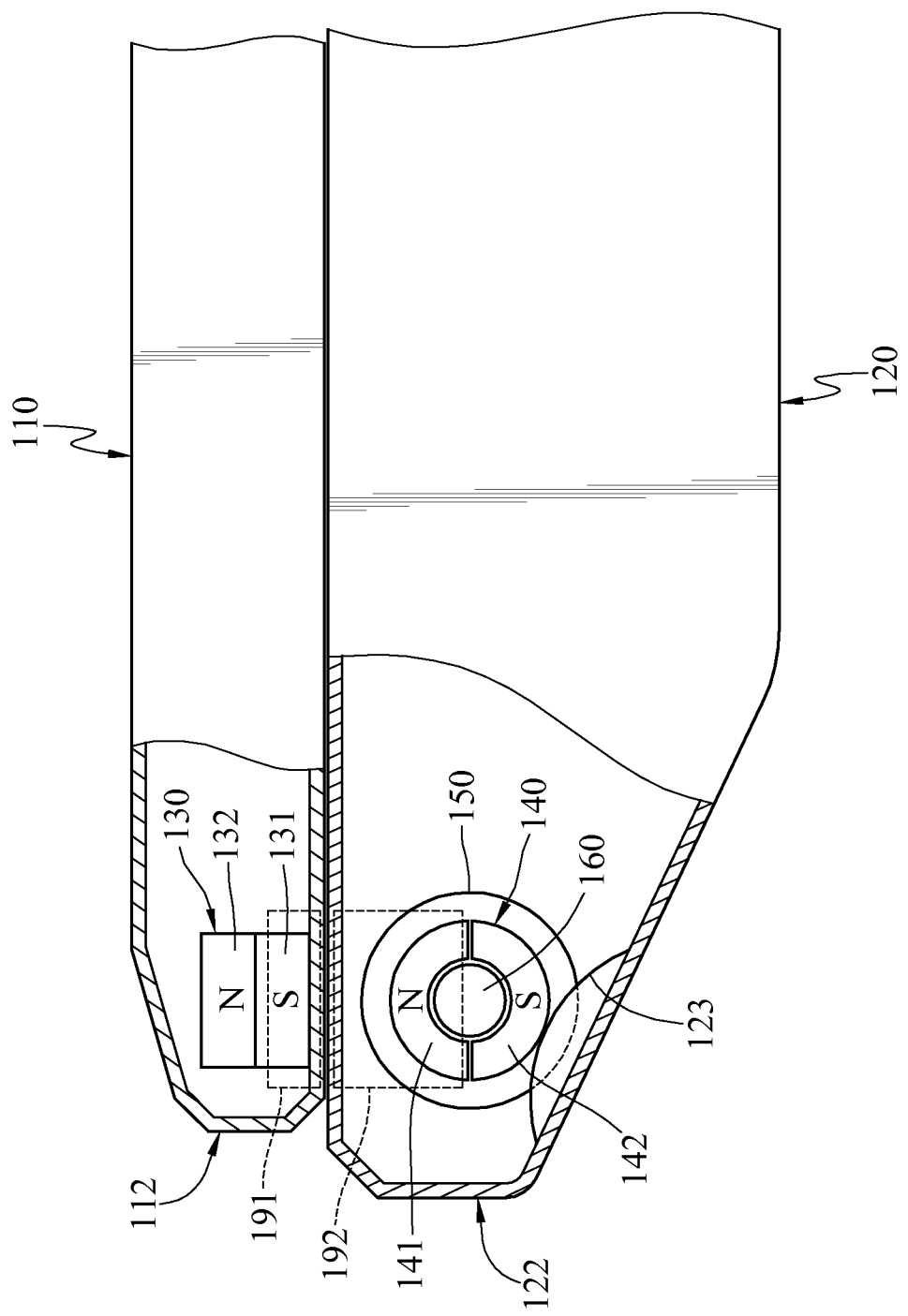
FIG. 2A is an enlarged cross-sectional view of a device having an opening structure located at a closing position according to an embodiment of the disclosure.

FIG. 2A is an enlarged cross-sectional view of the device having an opening structure 10 located at the closing position according to an embodiment of the disclosure. FIG. 2B is an enlarged cross-sectional view of the device having an opening structure 10 located at an unlocking position according to an embodiment of the disclosure. As shown in FIG. 2A and FIG. 2B, the first body 110 has a first locking part 191 disposed on the second side 112 of the first body 110. The second body 120 has a second locking part 192 disposed on the second side 122 of the second body 120. The first body 110 overlaps the second body 120 with the first locking part 191 being adjacent to the second locking part 192 when the second body 120 is located at the closing position. The first locking part 191 separates from the second locking part 192 when the second body 120 is located at the unlocking position.

The first magnetic component 130 has a first pole 131 and is fixed to the first locking part 191. The first pole 131 moves toward the second locking part 192 when locating at the closing position. The second magnetic component 140 has a second pole 141 and a third pole 142. The second pole 141 attracts the first pole 131 and the third pole 142 repels the first pole 131. The second pole 141 and the third pole 142 rotate around the first axis P1 to be located at or leave from the second locking part 192. The second pole 141 or the third pole 142 located at the second locking part 192 moves toward the first locking part 191. The second pole 141 or the third pole 142 leaving from the second locking part 192 moves backward the first locking part 191.

For instance, the first pole 131 of the first magnetic component 130 is S-pole and the first magnetic component 130 further includes a forth pole 132 which is N-pole. The second pole 141 of the second magnetic component 140 is N-pole and the third pole 142 is S-pole. As shown in FIG. 2A, the N-pole second pole 141 in the second locking part 192 attracts the S-pole first pole 131 in the first locking part 191 when the first body 110 and the second body 120 are located at the closing position. The first body 110 overlaps the second body 120 and is fixed on the second body 120.

When opening the first body 110, users rotate the knob 150 exposed to the concave surface 123 on the second body 120 to drive the pivot 160. The pivot 160 drives the second magnetic component 140 to rotate. As shown in FIG. 2B, the N-pole second pole 141 leaves from the second locking part 192 and moves backward the first locking part 191. The S-pole third pole 142 is rotated into the second locking part 192 and moves toward the first locking part 191. The S-pole first pole 131 repels the S-pole third pole 142 to make the first body 110 repelled from the second body 120. At this time, the first body 110 and the second body 120 are located at the unlocking position. Eventually, users lift the first body 110 directly to use the device having the opening structure 10. When users locate the first body 110 and the second body 120 at the closing position, the S-pole first pole 131 attracts the N-pole second pole 141 to the second locking part 192. Users also rotate the knob 150 to make the S-pole first pole 131 attract the N-pole second pole 141 to the second locking part 192, which lets the first locking part 191 and the second locking part 192 be locked magnetically.

In other embodiments, the first pole 131 of the first magnetic component 130 is N-pole, and further includes a forth pole 132 of the first pole 131 which is S-pole. The second pole 141 of the second magnetic component 140 is S-pole, and the third pole 142 thereof is N-pole.

Figure 3A:
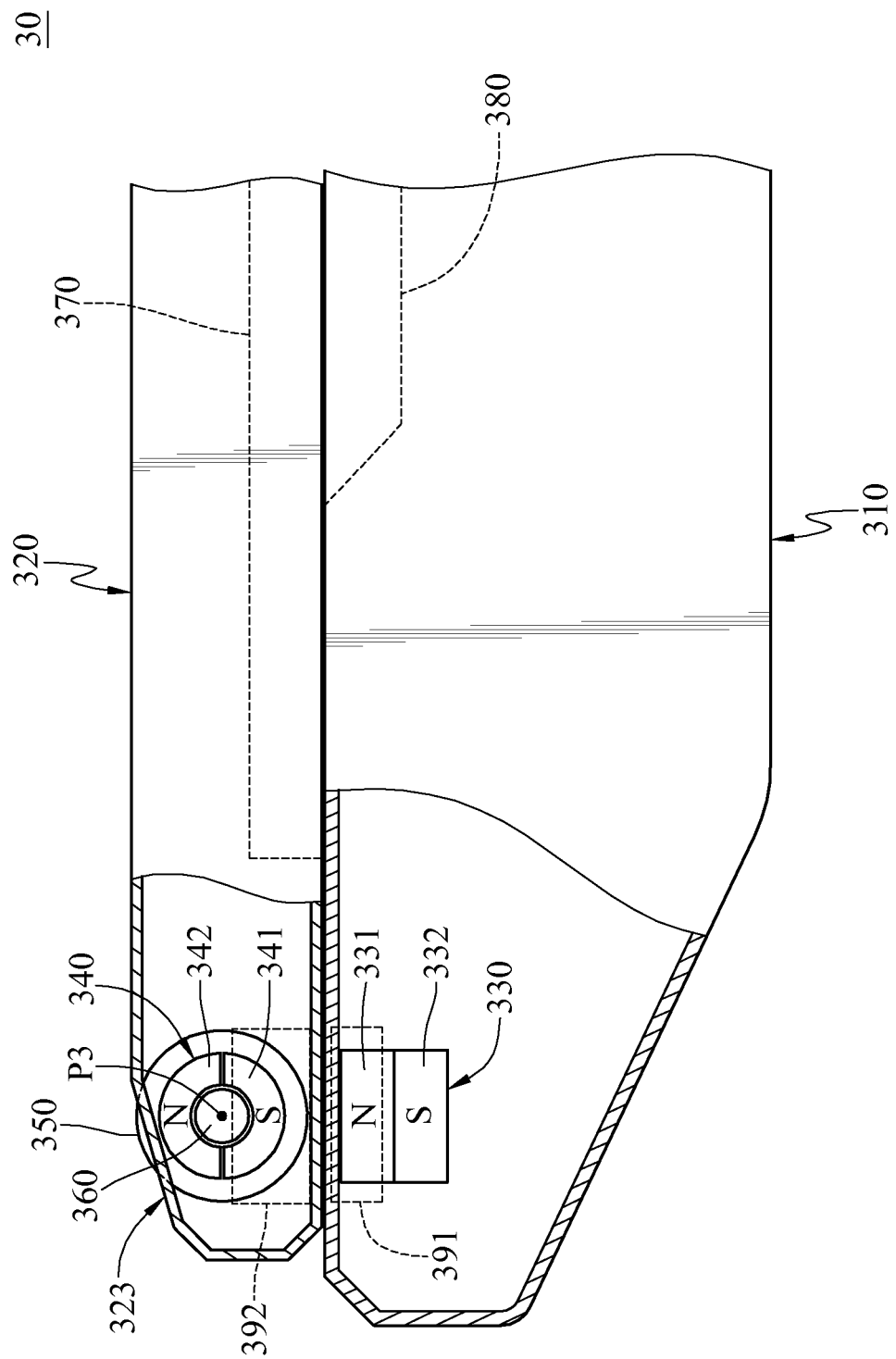
FIG. 3A is an enlarged cross-sectional view of a device having an opening structure located at a closing position according to another embodiment of the disclosure.
Figure 3B:
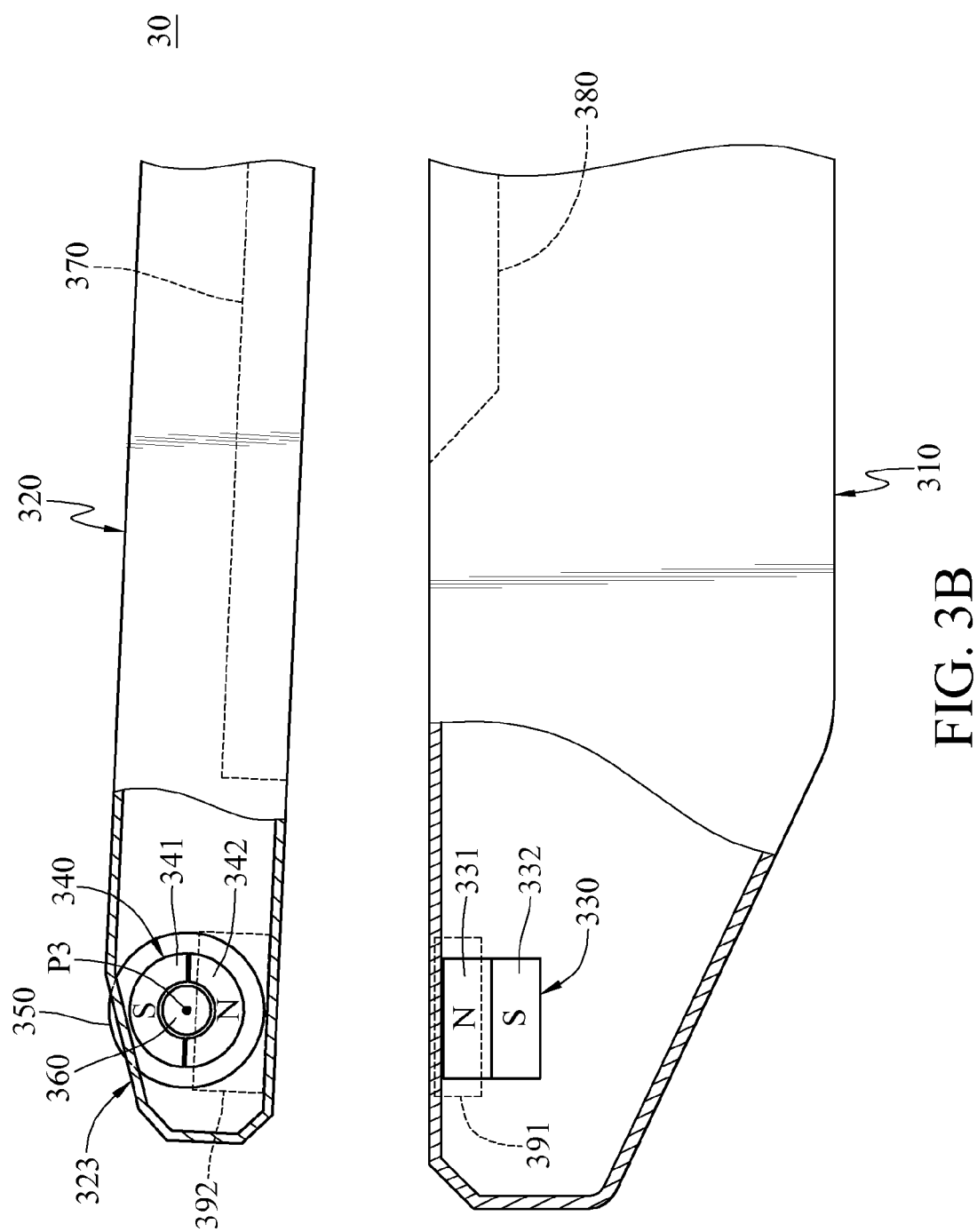
FIG. 3B is an enlarged cross-sectional view of a device having an opening structure located at an unlocking position according to another embodiment of the disclosure.

FIG. 3A is an enlarged cross-sectional view of the device having the opening structure 30 located at a closing position according to another embodiment of the disclosure. FIG. 3B is an enlarged cross-sectional view of the device having the opening structure 30 located at an unlocking position according to another embodiment of the disclosure. As shown in FIG. 3A and FIG. 3B, in this embodiment, the device having the opening structure 30 is similar to the device having the opening structure 10. However, a display unit 370 is disposed on the second body 320 in this embodiment. An input unit 380 is disposed on the first body 310. In this embodiment, the second body 320 is a screen of a notebook, and the first body 310 is a computer of a notebook. In other embodiments, the second body 320 is a tablet, and the first body 310 is a keyboard.

For instance, a first pole 331 of a first magnetic component 330 is N-pole and the first magnetic component 330 further includes a fourth pole 332 which is S-pole. A second pole 341 of a second magnetic component 340 is S-pole and a third pole 342 is N-pole. As shown in FIG. 3A, the S-pole second pole 341 I a second locking part 392 attracts the N-pole first pole 331 in a first locking part 391 when a first body 310 and a second body 320 are located at the closing position. The first body 310 overlaps the second body 320 and is fixed on the second body 320.

When opening the first body 310, users rotate a knob 350 exposed to a concave surface 323 on the second body 320 to drive a pivot 360. The pivot 360 drives the second magnetic component 340 to rotate. As shown in FIG. 3B, the S-pole second pole 341 leaves from the second locking part 392 and moves backward the first locking part 391. The N-pole third pole 342 is rotated into the second locking part 392 and moves toward the first locking part 391. The N-pole first pole 331 repels the N-pole third pole 342 to make the first body 310 repelled from the second body 320. At this time, the first body 310 and the second body 320 are located at the unlocking position. Eventually, users lift the first body 310 directly to use the device having the opening structure 30. When users locate the first body 310 and the second body 320 at the closing position, the N-pole first pole 331 attracts the S-pole second pole 341 to the second locking part 392. Users also rotate the knob 350 to make the N-pole first pole 331 attract the S-pole second pole 341 to the second locking part 392, which lets the first locking part 391 and the second locking part 392 be locked magnetically.

In other embodiments, the first pole 331 of the first magnetic component 330 is S-pole, and further includes a forth pole 132 of the first pole 331 which is N-pole. The second pole 341 of the second magnetic component 340 is N-pole, and the third pole 342 of the second magnetic component 340 is S-pole.

To sum up, the device having the opening structure and the opening structure thereof are provided in this disclosure. The opening structure fixes the first body and the second body where the opening structure is disposed by attracting the first pole to the second pole. The opening structure further unlocks the first body from the second body by repelling the first pole from the second pole. The disclosure prevents the instability of the locking state induced by the friction or by elastic fatigue.

What is claimed is:

1. A device having an opening structure, comprising:
   a first body where a first locking part of the opening structure is disposed; and
   a second body where a second locking part of the opening structure is disposed,
   wherein the first body is disposed on the second body and has a closing position and an unlocking position relative to the second body, the first body overlaps the second body with the first locking part being adjacent to the second locking part when the first body is located at the closing position, the first locking part separates from the second locking part when the first body is located at the unlocking position;
   wherein the opening structure further comprises:
      a first magnetic component having a first pole and is fixed to the first locking part;
      a second magnetic component having a second pole and a third pole;
      a knob disposed on the second body; and
      a pivot disposed on the second body; and
   wherein the second pole attracts the first pole, the third pole repels the first pole, the second magnetic component is pivoted on the second body around a first axis, the second pole and the third pole rotate around the first axis to be located at or leave from the second locking part, the first body is pivoted on the second body around a second axis so as to move between the closing and unlocking positions, the first axis is parallel to the second axis, the pivot is located at the first axis, the second magnetic component and the knob are fixed to the pivot such that actuation of the knob rotates the second and third poles around the first axis, and at least part of the knob is exposed to a surface of the second body.

2. The device having opening structure according to claim 1, wherein the first body is pivoted on the second body mutually.

3. The device having opening structure according to claim 1, wherein both the first body and the second body have a first side and a second side opposite to each other, the first side of the first body is pivoted on the first side of the second body mutually, the first locking part is disposed on the second side of the first body, and the second locking part is disposed on the second side of the second body.

4. The device having opening structure according to claim 1, further comprising a display unit and an input unit, wherein the display unit is disposed on the first body, and the input unit is disposed on the second body.

5. The device having opening structure according to claim 1, further comprising a display unit and an input unit, wherein the display unit is disposed on the second body, the input unit is disposed on the first body.

6. An opening structure configured to be disposed on a device, wherein the device has a first body and a second body, the first body is disposed on the second body and has a closing position and an unlocking position relative to the second body, the first body overlaps the second body when the first body is located at the closing position; the opening structure comprising:
   a first locking part configured to be disposed on the first body;
   a second locking part configured to be disposed on the second body, wherein the first locking part is adjacent to the second locking part when the first body is located at the closing position, the first locking part separates from the second locking part when the first body is located at the unlocking position;
   a first magnetic component having a first pole and is fixed to the first locking part;
   a second magnetic component having a second pole and a third pole;
   a knob; and
   a pivot,
   wherein the second pole attracts the first pole, the third pole repels the first pole; the second magnetic component is configured to be pivoted on the second body, the second pole and the third pole rotate around a first axis to be located at or leave from the second locking part, the first body is pivoted on the second body around a second axis so as to move between the closing and unlocking positions, the first axis is parallel to the second axis, the pivot is located at the first axis, the second magnetic component and the knob are fixed to the pivot such that actuation of the knob rotates the second and third poles around the first axis, and at least part of the knob is exposed to a surface of the second body.

* * * * *